(No Model.)
A. N. WOLF.
BOLTING REEL.
No. 321,875. Patented July 7, 1885.
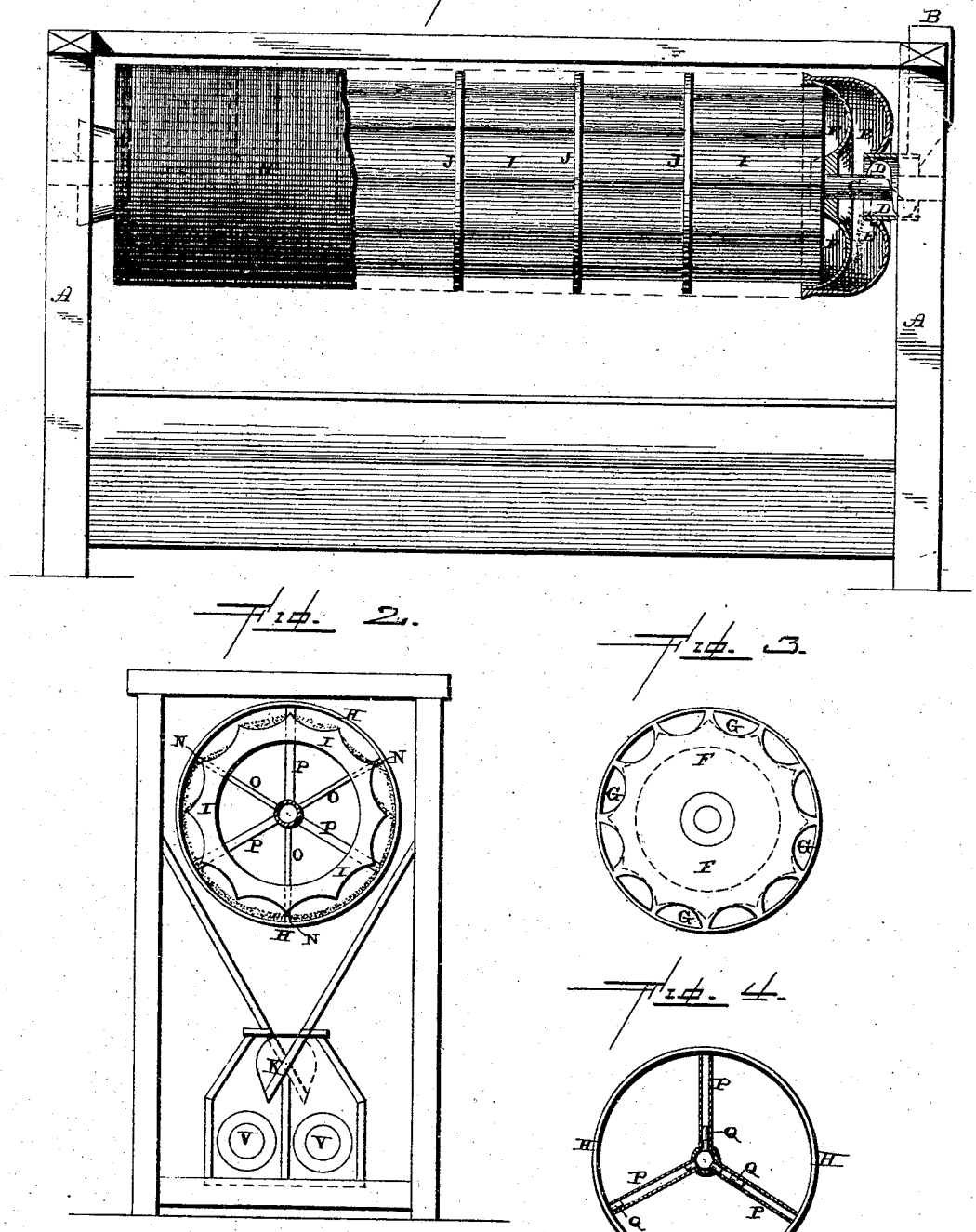
Witnesses
L. J. Gardner
Jno. O. Prosperi
Inventor
A. N. Wolf,
per F. A. Lehmann, atty.

UNITED STATES PATENT OFFICE.

ABRAHAM N. WOLF, OF ALLENTOWN, PENNSYLVANIA.

BOLTING-REEL.

SPECIFICATION forming part of Letters Patent No. 321,875, dated July 7, 1885.

Application filed April 1, 1885. (No model.)

*To all whom it may concern:*

Be it known that I, ABRAHAM N. WOLF, of Allentown, in the county of Lehigh and State of Pennsylvania, have invented certain new and useful Improvements in Bolting-Reels; and I do hereby declare the following to be a full, clear, and exact description of the invention, such as will enable others skilled in the art to which it pertains to make and use it, reference being had to the accompanying drawings, which form a part of this specification.

My invention relates to an improvement in bolting-reels; and it consists in, first, the combination of the reel, the fluted cylinder placed therein, the ribs placed inside of the reel, the hollow arms, and knockers which are placed in the arms; and second, the combination of the reel, the reel-shaft, an outer metallic head which surrounds the inlet-pipe and acts as a receiver for the material before it passes into the reel, and an inner metallic head placed upon the reel-shaft and inside of the outer head, the inner head being perforated around its outer edge, so that the material can pass through the perforations into the reel, as will be more fully described hereinafter.

The object of my invention is to close the end of the reel by means of a double head, so as to prevent all dirt and waste of material at this point, and to place inside of the reel devices which will serve to keep the material being bolted in contact with a greater amount of the bolting-surface than can be accomplished in reels of the ordinary construction.

Figure 1 is a side elevation of a reel embodying my invention, the parts being broken away. Fig. 2 is an end view of the reel. Fig. 3 is an end view of the inner head. Fig. 4 is a vertical section taken through the reel, and showing the hollow arms.

A represents a suitable frame-work; B, the pipe through which the material is fed to the bolt; C, the reel-shaft, and D the conveyer, which is attached to the shaft C for forcing the material from the short pipe D through the outer head, E, of the reel. This head E is perforated only at its center, where the end of the pipe D passes into it, as shown in Fig. 1. Placed inside of the outer head, E, is a second head, F, which is similar in shape, but which is closed at its center, and is provided with a series of perforations, G, through it near its outer edge, through which openings G the material to be bolted is passed into the reel H.

The heads E F serve to close the end of the reel, as shown, so as to prevent the escape of all dust and waste of material at this point. The end of the reel H projects inside of the outer head, F, as shown, and when the reel is made to revolve, the material to be bolted is fed through the openings G evenly over the inner surface of the reel H. The reel H will be of any suitable construction, and inside of it is placed a fluted cylinder, I, which revolves with the reel, and which is surrounded by the rings or bands J at suitable distances apart, and upon which rings or bands the bolting-cloth is stretched. Inside of the reel, at suitable distances apart, are placed longitudinal ribs N, which, as the reel revolves, serve to catch a quantity of the material and to carry it up, and then drop it back upon the fluted cylinder I. This cylinder I, having any desired number of flutes or scallops, catches the material to be bolted as it drops from the ribs, and carries it around until the scallops or flutes reach that point where the material will be thrown off from it, and against the inner side of the bolting-cloth.

In ordinary reels, where there is nothing to catch the material being bolted and to throw it against the side of the bolting-cloth, as is here shown, the bolting-cloth is brought into use only at that point which forms the bottom of the reel. Where the material is thrown against the inner side of the cloth, as is here shown and described, a much larger surface of the reel is brought into play, and hence the material is bolted more rapidly.

The cylinder I and the reel H are secured to the shaft C by means of the solid arms O and the hollow ones P, in which the knockers Q are placed. As the reel revolves these knockers move back and forth in pipes or hollow arms P, and cause a constant jarring of the reel, for the purpose of keeping the bolting-cloth clean without the use of a brush or other similar device.

As the material is bolted it drops down, and can be discharged upon either one of the conveyers V by means of a pivoted valve, K, at the will of the operator.

Having thus described my invention, I claim—

1. The combination of the reel, the fluted cylinder placed therein, the ribs placed inside of the reel, the hollow arms and knockers which are placed in the hollow arms, substantially as shown and described.

2. The combination of the reel, the reel-shaft, and the outer metallic head, which has a perforation through its center so as to receive the inlet-pipe, and which head acts as a receiver for the material before it passes into the hopper, with the inner head, F, which is secured to the reel-shaft at its center, has a series of perforations through its outer edge for the material to pass through into the reel, and which head F is secured inside of the one E, substantially as shown.

In testimony whereof I affix my signature in presence of two witnesses.

ABRAHAM N. WOLF.

Witnesses:
ANDREW YINGLING,
THOS. O. GINKINGER.